United States Patent
Ogawa et al.

(10) Patent No.: US 6,517,401 B1
(45) Date of Patent: Feb. 11, 2003

(54) PROCESS FOR THE PRODUCTION OF MONOMOLECULAR CHEMISORPTION FILM, AND PROCESSES FOR THE PRODUCTION OF LIQUID CRYSTAL ALIGNMENT FILMS AND LIQUID CRYSTAL DISPLAYS BY USING THE CHEMISORPTION FILM

(75) Inventors: Kazufumi Ogawa, Nara (JP); Tadashi Ohtake, Neyagawa (JP); Takaiki Nomura, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/554,722

(22) PCT Filed: Nov. 16, 1998

(86) PCT No.: PCT/JP98/05144

§ 371 (c)(1),
(2), (4) Date: May 18, 2000

(87) PCT Pub. No.: WO99/25487

PCT Pub. Date: May 27, 1999

(30) Foreign Application Priority Data

Nov. 18, 1997 (JP) .............................................. 9-317230
Nov. 18, 1997 (JP) .............................................. 9-317299

(51) Int. Cl.[7] ........................... C09K 19/56; B05D 3/10
(52) U.S. Cl. .......................... 445/24; 427/352; 427/353; 427/162; 427/553; 427/379
(58) Field of Search ............................... 427/162, 372.2, 427/379, 553, 582, 584, 352, 353; 445/24

(56) References Cited

U.S. PATENT DOCUMENTS

| 4,730,904 | A | * | 3/1988 | Pauluth et al. | |
| 5,133,895 | A | | 7/1992 | Ogawa et al. | |
| 5,234,718 | A | | 8/1993 | Mino et al. | 427/352 |
| 5,468,519 | A | | 11/1995 | Akiyama et al. | |
| 5,571,622 | A | | 11/1996 | Ogawa et al. | |
| 5,580,605 | A | | 12/1996 | Ogawa et al. | 427/352 |
| 5,702,777 | A | | 12/1997 | Rosch et al. | 428/1 |
| 5,849,369 | A | | 12/1998 | Ogawa | |

FOREIGN PATENT DOCUMENTS

| EP | 0 612 755 | 8/1994 |
| JP | 55-004016 A | 1/1980 |
| JP | 56-024320 A | 3/1981 |
| JP | 03-007913 A | 1/1991 |
| JP | 03-179426 A | 8/1991 |
| JP | 04-356020 A | 12/1992 |
| JP | 06-327971 A | 11/1994 |

* cited by examiner

Primary Examiner—Kenneth J. Ramsey
(74) Attorney, Agent, or Firm—Parkhurst & Wendel, L.L.P.

(57) ABSTRACT

The invention provides methods of forming a monomolecular chemisorption film having an excellent uniformity and liquid crystal alignment performance with a high production efficiency. The monomolecular chemisorption film of the invention can be suitably used for liquid crystal alignment layers. A method according to the invention includes at least the steps of forming a solution layer on a surface of a substrate, by contacting the adsorption solution with the surface of the substrate, the adsorption solution including a silane-based surface active agent, and a nonaqueous organic solvent, accelerating a chemisorption reaction by evaporating the organic solvent and concentrating the surface active agent contained in the solution layer in a dry atmosphere having a relative humidity of 30% or lower to chemisorb the molecules of the surface active agent onto the surface of the substrate, aging to complete the chemisorption reaction for a predetermined time, after the evaporating the organic solvent in the solution layer, and washing the surface of the substrate with a nonaqueous organic solvent to remove unreacted molecules of the surface active agent remaining on the surface of the substrate.

34 Claims, 10 Drawing Sheets

PROCESS FOR THE PRODUCTION OF MONOMOLECULAR CHEMISORPTION FILM, AND PROCESSES FOR THE PRODUCTION OF LIQUID CRYSTAL ALIGNMENT FILMS AND LIQUID CRYSTAL DISPLAYS BY USING THE CHEMISORPTION FILM

TECHNICAL FIELD

The present invention relates to methods of forming monomolecular chemisorption films obtained by chemisorbing adsorbate molecules on a surface of a base material. More particularly, the invention relates to methods of forming monomolecular chemisorption films used for antifouling films, liquid crystal alignment layers, polarizing films, retardation films, conductive films for molecular devices or the like. The invention further relates to methods of manufacturing liquid crystal display devices utilizing such thin films.

BACKGROUND OF THE INVENTION

Monomolecular thin films (also referred to as "monomolecular chemisorption films") have conventionally been produced by the methods comprising the steps of immersing a base material in a chemisorption solution containing a nonaqueous organic solvent and an adsorbate at a relatively low concentration for a predetermined time, thereafter react the adsorbate with the surface of the base material, and thereafter washing the unadsorbed molecules away from the surface of the base material. In such conventional methods, since the chemisorption solution contains the adsorbate at a low concentration, the adsorbate is not excessively adsorbed to the surface of the base material. Therefore, uniform monomolecular films can be readily obtained. In addition, since the adsorbate is lost little in the step of washing, the adsorbate can be efficiently used, leading to high cost efficiency in production.

However, in such conventional methods, it takes a long time to react the adsorbate with the base material, and therefore the base material needs to be immersed in the solution for a long time, leading to poor production efficiency. For example, in the case where the chemisorption solution contains a silane-based surface active agent (an adsorbate) having a linear hydrocarbon chain group and Si at a concentration of 1% by weight, the base material needs to be immersed in the solution for approximately two hours.

In view of such a drawback in the conventional methods, various attempts to improve the production efficiency have been made, but heretofore no such attempts have been successful in achieving a simple and effective method. For example, by heating the chemisorption solution, it is possible to improve the reactivity and thereby to reduce the time for immersing the base material to a certain extent. However, when the chemisorption solution is heated, such disadvantageous effects are incurred that the solvent is evaporated or boiled in the immersing reaction and that the decomposition or side reaction of the adsorbate molecules is caused, and thus it is difficult to produce good uniform monomolecular chemisorption films. In addition, by heating the solution, the amount of evaporating solvent increases, and this requires a consideration for providing special explosion-proof facilities. Due to such drawbacks, it is generally undesirable to heat the chemisorption solution to a temperature higher than 80° C., but heating the solution up to such a temperature only reduces the reaction time by about 10–20%.

It is, on the other hand, also possible to reduce the time for immersing the base material by increasing the concentration of the adsorbate in the solution. However, the increase of the concentration of the adsorbate induces such a drawback that the adsorbate is excessively attached onto the substrate surface, which results in a difficulty in forming uniform monomolecular films and a poor utilization efficiency of the adsorbate.

DISCLOSURE OF THE INVENTION

In view of the foregoing and other drawbacks in prior art, it is a primary object of the present invention to provide methods of forming monomolecular chemisorption films that are excellent in uniformity and molecular alignment property and usable for liquid crystal alignment layers. More specifically, it is a first object of the present invention to provide methods of forming extremely thin monomolecular films which is formed to have a thickness at the nanometer level within a short production time.

It is a second object of the invention to provide methods of forming such monomolecular films capable of controlling an alignment of liquid crystal molecules in a predetermined direction (for example, liquid crystal alignment layers).

It is a third object of the invention to provide methods of manufacturing liquid crystal display devices utilizing such liquid crystal alignment layers.

In order to accomplish the foregoing and other objects, the present invention provides the following methods:

(1) The present invention provides methods of forming a monomolecular chemisorption film comprising at least the steps of: forming a solution layer on a surface of a base material by contacting the chemisorption solution with the surface of the base material in a dry atmosphere, the chemisorption solution including a silane-based surface active agent and a nonaqueous organic solvent; and chemisorbing molecules of the surface active agent onto the surface of the base material by evaporating the organic solvent contained in the solution layer in the dry atmosphere.

In the above-described method, the chemisorption solution is applied onto the base material sufficiently but not excessively to form the solution layer formed of the chemisorption solution, and thereafter the chemisorption solution is concentrated on the surface of the base material. By employing this method, the chemisorption reaction proceeds in a remarkably efficient manner. Accordingly, a monomolecular thin film can be formed within a short time.

Now, the technical significance of the above-described constitution of the invention is explained below. Ideally, in a monomolecular chemisorption film formed on the surface of the base material, the adsorbate molecules are bonded to the surface of the base material at one end of the molecules, and are arrayed along the surface of the base material in a monolayer-like manner. In order to form such an ideal chemisorption film, the chemical adsorbate molecules need to be bonded sufficiently but not exceedingly to all the possible positions on the surface where the molecules can be adsorbed. For this purpose, it is preferable that the concentration of the chemisorption solution should be made low so that the adsorbate molecules can move freely. However, when the concentration of the solution is low, it takes a long time to adsorb the molecules to all the possible positions, and therefore the production efficiency is poor. Nevertheless, by employing the above-described method, since the solution is concentrated after applied onto the base material, the adsorbing reaction can be completed within a short time even in the case of the solution having a low concentration.

In addition, since the solution has a low initial concentration, the affinity of the solution with the base material is good, and a thin, uniform coating layer (solution layer) can be formed on the base material. As a result, excessive use of the chemisorption solution is eliminated and uniform thin films are readily formed. Moreover, the concentration of the adsorbate molecules on the base material gradually increases corresponding to the evaporation of the solvent, resulting in a smooth chemisorption reaction. Consequently, in comparison with the case of the solution having a high initial concentration, it is possible to form a chemisorption film with a higher quality in which unadsorbed molecules remaining on the base material is less, and a density of the adsorbed molecules is higher. According to the experiments by the present inventors, by employing the above-described method, the reaction time was reduced to approximately 1 to 11 minutes, whereas in conventional methods (immersing reaction methods) the time was approximately 1 to 2 hours.

(2) The above-described method (1) may be such a method comprising the steps of: accelerating a chemisorption reaction by evaporating the organic solvent and concentrating a silane-based surface active agent contained in the solution layer; aging to complete the chemisorption reaction for a predetermined time, after the evaporating organic solvent; and washing the surface of the base material with a nonaqueous organic solvent to remove unadsorbed surface active agent remaining on the surface of the base material.

The reaction (chemisorption reaction) in the above-described method is gradually accelerated until the concentration of the surface active agent in the solution layer reaches 100%, and the aging is allowed to further continue thereafter. According to this method, the accelerating of the chemisorption reaction by the concentrating and the aging complement each other, and the chemisorption reaction can proceed smoothly and quickly. In the above-described step of aging, the concentration of the surface active agent molecules has already reached 100% and the reactivity of the solution has become high, and therefore, the chemisorption reaction can proceed further even in the case where the adsorbing reaction has not been completed when the evaporation of the solvent is finished. Accordingly, the chemisorption reaction is performed in a remarkably efficient manner.

In addition, by employing the above-described method, when the adsorbate molecules has a low reactivity, or when the solvent evaporates at a high evaporation rate, it is only necessary to increase the time for the aging, and therefore, regardless of the properties of the adsorbates or the solvents, the reduction of the reaction time can be achieved without spoiling the quality of the thin films.

In addition, the above-described method comprises the step of washing the unadsorbed molecules remaining on the surface of the base material to remove the molecules from the surface after the step of the aging, and this step serves to form a uniform monomolecular thin film. The technical significance of the step of washing is as follows. In order to form a uniform monomolecular chemisorption film, the adsorbate molecules need to be chemically bonded to all the possible positions (generally, hydrophilic groups) on the surface of the base material sufficiently but not excessively. However, it is difficult to equalize the number of the adsorbate molecules in the solution layer to the number of the possible positions (active sites) on the surface of the base material where the molecules can be adsorbed. For this reason, it is necessary that the number of the adsorbate molecules such as surface active agent molecules to be applied on the surface of the base material should be more than the number of the possible positions where the molecules can be chemically adsorbed. Thus, at the completion of the chemisorption reaction, unadsorbed molecules remain on the surface of the base material. The unadsorbed molecules inhibit the formation of monomolecular chemisorption films by, for example, attaching onto the chemisorption films. However, by washing the surface of the base material after the aging, the molecules other than those adsorbed on the substrate, i.e., the unadsorbed molecules can be removed, and thereby a high-quality monomolecular chemisorption film in which adsorbed molecules are arrayed along the surface of the substrate in a monolayer-like manner can be formed.

(3) In the methods as described in (1) and (2), the dry atmosphere may be an atmosphere having a relative humidity of 30% or less.

In the method of the present invention, the silane-based surface active agent that can be adsorbed on the surface of the base material is used for forming methods of the present invention, and such a silane-based surface active agent has a property such that it reacts with water. Therefore, if the above-described methods are performed in an atmosphere having a high humidity, the silane-based surface active agent reacts with the moisture in the atmosphere, spoiling the reactivity with the base material and causing turbidity in the chemisorption film. By employing the atmosphere having a relative humidity of 30% or less, the adsorbing reaction can proceed without causing such a problem.

Examples for the atmosphere having a relative humidity of 30% or less may include an air atmosphere having a relative humidity of 30% or less. In addition, an inert gas having a relative humidity of 30% or less may be employed. Further, means for heating, decompression, blasting may be employed for preparing these atmospheres.

(4) In the methods as described in (1) to (3), it is preferable that the chemisorption solution is a nonaqueous organic solvent having a boiling point of 100 to 250° C.

Since the organic solvent having a boiling point of 100 to 250° C. has an appropriate evaporation rate at the room temperature (25° C.), such solvent is desirable in performing the accelerating the chemisorption by the concentration of the solution at the room temperature (25° C.). In other words, by employing the organic solvent with the above-described boiling point, the reduction of the reaction time is achieved and at the same time, high-quality chemisorption films can be formed.

(5) Each of the nonaqueous organic solvent in the chemisorption solution and the nonaqueous organic solvent employed in the step of washing in the methods as described in (1) to (3) may have a functional group selected from the group consisting of an alkyl group, a fluorocarbon group, a chlorocarbon group and a siloxane group.

The above-described organic solvent having the functional groups is highly capable of dissolving the silane-based surface active agents, and moreover, the solvent absorbs little water and can be easily dehydrated. Accordingly, such an organic solvent is desirable as a solvent of the adsorbate, and can be suitably used for a solvent for washing the unadsorbed molecules.

(6) It is preferable that the organic solvent having a siloxane group in the method as described in (5) be a silicone-based solvent. The silicone-based solvent absorbs little water, and the water contained in the solvent can be readily dehydrated. In addition, the silicone-based solvent is excellently cosoluble with the silane-based surface active agent. Accordingly, an adsorbing reaction can proceed smoothly and the high-quality chemisorption film can be formed.

(7) The surface active agent as in the methods as described in (1) to (6) may be a mixture of a plurality of surface active agents having a different critical surface energy each other.

When such a mixture of a plurality of surface active agents is employed, the resulting chemisorption film becomes such that the molecules of each type of surface active agents are adsorbed on the base material in a mixed state, and the property of the resulting film becomes such that both types of the adsorbed molecules are mixed. Therefore, the properties of the chemisorption film, such as a water repelling property and oil repelling property, can be finely controlled by adjusting the combinations of the critical surface energies of the surface active agents and by varying the mixing ratios of the surface active agents, and in the case of utilizing the chemisorption film as a liquid crystal alignment layer, the alignment control performance for liquid crystal molecules can be arbitrarily adjusted. In addition, the chemisorption methods according to the present invention exhibits the above-described advantageous effects by comprising the steps of an accelerating reaction and an aging in the case of using such multi-component chemisorption solution as well.

(8) The surface active agent in the methods as described in (1) to (6) may be a silane-based surface active agent comprising one of a linear carbon chain and a linear siloxane chain; and at least one silyl group selected from the group consisting of a chlorosilyl group, an alkoxysilyl group and an isocyanatosilyl group.

These silane-based surface active agents are excellent in the reactivity with the base material. The chemisorption methods in the present invention performs the above-described advantageous effects in the case of using these silane-based surface active agents as well.

(9) The carbon chain or siloxane chain in the method as described in (8) may be such that an end or a part thereof is substituted by at least one organic group selected from the group consisting of a carbon trifluoride group (—$CF_3$), a methyl group (—$CH_3$), a vinyl group (—CH=$CH_2$), an allyl group (—CH=CH—), an acetylene group (—C≡C—), a phenyl group (—$C_6H_5$), an aryl group (—$C_6H_4$—), a halogen atom, an alkoxy group (—OR, where R is an alkyl group), a cyano group (—CN), an amino group (—$NH_2$), a hydroxyl group (—OH), a carbonyl group (=CO), an carboxy group (—COO—) and a carboxyl group (—COOH).

The silane-based surface active agent having the above-described organic groups is excellent in controlling the alignment of the adsorbate molecules, and is particularly suitable for forming a liquid crystal alignment layer.

(10) The methods of forming a liquid crystal alignment layer according to the present invention are now described hereinafter. The invention also provides: a method of forming a liquid crystal alignment layer comprising a chemisorption film wherein molecules of a surface active agent are chemisorbed on a surface of a substrate on which an electrode is provided, comprising at least the steps of forming a solution layer on the surface of the substrate by contacting a chemisorption solution with the surface of the substrate, the chemisorption solution including the silane-based surface active agent and a nonaqueous organic solvent; chemisorbing molecules of the surface active agent onto the surface of the substrate by evaporating the organic solvent contained in the solution layer in the dry atmosphere; and washing the surface of the substrate with a nonaqueous organic solvent to remove unreacted molecules of the surface active agent remaining on the surface of the substrate.

(11) In the method of forming a liquid crystal alignment layer as described in (10), the step of chemisorbing may comprise the steps of accelerating a chemisorption reaction by evaporating the organic solvent and concentrating a silane-based surface active agent contained in the solution layer; and aging to complete the chemisorption reaction for a predetermined time after the evaporating organic solvent.

(12) In the methods as described in (10) and (11), the step of pre-aligning the adsorbed molecules chemisorbed on the substrate surface in a predetermined direction, by pulling the substrate out in a predetermined direction in a dry atmosphere to drain-dry the solvent on the substrate surface may be provided after the step of washing.

(13) In the method as described in (12), the step of realigning the adsorbed molecules pre-aligned in a predetermined direction by irradiating the substrate surface with a polarized light is provided after the step of pre-aligning.

The steps of forming a solution layer, chemisorbing and washing in the above-described (10) and (11) are basically the same as methods of forming a monomolecular chemisorption film described in the above-described (1) to (9), except that the substrate having an electrode formed thereon is employed as the base material. Accordingly, the steps particularly required in forming a liquid crystal alignment layer are described below.

In the method as described in (12), the step of pre-aligning adsorbate molecules by pulling out the substrate in a predetermined direction to drain-dry the solvent on the substrate surface is provided after the step of washing. According to such a method, since the drain-drying of the washing solution attached on the substrate also serves for the pre-aligning treatment of the adsorbate molecules, the pre-aligned film can be formed efficiently. Next, the technical significance of drain-drying is described below. When the substrate wet with the washing solution is dried in a standing condition in the dry atmosphere, the top end of the wet surface gradually proceeds downward (in the direction of gravitation), and the drying proceeds from the top end of the wet surface towards a downward direction. The present inventors have found in the study of the above chemisorption film that the adsorbed molecules on the substrate are aligned in the direction of the drain-drying. The above-described methods are accomplished based on these findings. The alignment by a drain-drying method is referred to as a pre-alignment in the specification. The pre-aligned film can be usable for a liquid crystal alignment layer because the pre-aligned film can also control the liquid crystal molecules in a predetermined direction. However, the pre-aligned film is insufficient in the stability against external stresses such as heat and friction, when compared with the realigned layer described below (the chemisorption film after irradiating with a polarized light).

In view of the above problems, in the method as described in (13), the step of realigning by irradiating the pre-aligned film (the chemisorption film after pre-aligning) with a polarized light is added. The step of realigning after the pre-aligning makes the alignment state of the chemisorption film more stable, and increases the resistance to the external stresses such as heat and friction, and furthermore, improves the surface anchoring force over the liquid crystal molecules. The reason for providing the step of realigning after the pre-aligning is that by irradiating with such a polarized light as ultraviolet rays after pre-aligning, the adsorbed molecules can be realigned uniformly and efficiently in a predetermined direction. In particular, in the case of employing the surface active agent having a photoreactive group, by irradiating with a polarized light, the adsorbed molecules can be crosslinked or polymerized each other, and thus an even greater surface anchoring force over the liquid crystal can be obtained on the chemisorption film.

It is noted that the direction of polarization of the polarized light in the realigning is preferably crossed the drain-drying direction not at a right angle but at least an angle with a little shift from 90°, preferably more than several degrees shifted from 90°. The reason is that, when crossed at an angle of 90°, there is a possibility that the adsorbed molecules are aligned in two directions in the same probability. In addition, when the pre-aligned film is irradiated with a polarized light having the direction of polarization parallel to the drain-drying direction, the direction of inclination of the adsorbed molecules becomes identical to the direction of crosslinking, and thereby the directions of the adsorbed molecules become more uniform and the resulting realigned film has a more excellent surface anchoring force to the liquid crystal molecules.

(14) The surface active agent in the above-described methods of forming the liquid crystal alignment layer may be a mixture of a plurality of surface active agents having a different critical surface energy each other.

(15) The surface active agent in the above-described methods may be a silane-based surface active agent comprising one of a linear carbon chain and a linear siloxane chain; and at least one silyl group selected from the group consisting of a chlorosilyl group, an alkoxysilyl group and an isocyanatosilyl group.

(16) The carbon chain or siloxane chain in the above-described methods may be such that an end or a part thereof is substituted by at least one organic group selected from the group consisting of a carbon trifluoride group (—$CF_3$), a methyl group (—$CH_3$), a vinyl group (—CH=$CH_2$), an allyl group (—CH=CH—), an acetylene group (—C≡C—), a phenyl group (—$C_6H_5$), an aryl group (—$C_6H_4$—), a halogen atom, an alkoxy group (—OR, where R is an alkyl group), a cyano group (—CN), an amino group (—$NH_2$), a hydroxyl group (—OH), a carbonyl group (=CO), an carboxy group (—COO—) and a carboxyl group (—COOH).

(17) In the above-described methods, the dry atmosphere may be an atmosphere having a relative humidity of 30% or less.

(18.1) In the above-described methods, the chemisorption solution may comprise a nonaqueous organic solvent having a boiling point of 100 to 250° C.

(18.2) In the above-described methods, each of the nonaqueous organic solvent in the chemisorption solution and the nonaqueous organic solvent used in the step of washing may have a functional group selected from the group consisting of an alkyl group, a fluorocarbon group, a chlorocarbon group and a siloxane group.

(18.3) In the above-described methods, the organic solvent having a siloxane group may be a silicone-based solvent.

(19) In the above-described methods, the chemisorption solution in the step of forming a solution layer may be applied onto the substrate surface by one of an offset printing, a screen printing, and a roll coating. The chemisorption solution may have a solution viscosity of 1 to 50000 cSt. A silicone may be used as a solvent for adjusting the solution viscosity of the chemisorption solution.

(20) The method of forming a liquid crystal alignment layer as described in (10) may further comprise the step of forming an underlayer prior to the step of forming the solution layer, wherein: another solution layer is formed on the substrate surface directly by contacting another solution to the substrate surface, the foregoing another solution wherein a chemical adsorbate having a plurality of chlorosilyl groups is dissolved in a solvent; thereafter the solvent in the foregoing another solution layer is evaporated in a dry atmosphere to form siloxane-bonds from the chemical adsorbate in the foregoing another solution layer on the substrate surface; thereafter the substrate surface is washed to remove unadsorbed molecules from the substrate surface; and the substrate surface is exposed to a moist air, so that OH groups are added to chlorosilyl groups in the molecules of the adsorbate.

The above-described step of forming the underlayer is similar to the foregoing method of forming a chemisorption film according to the present invention in which the accelerating the chemisorption reaction by the concentrating and the aging are provided, and therefore, it is made possible to form the underlayer within a remarkably short time. As the adsorbate used in the step of forming an underlayer, a chemical adsorbate having a plurality of chlorosilyl groups can be used. The chemical adsorbate having a plurality of chlorosilyl groups can be readily chemisorbed onto the substrate, and when the adsorbed molecules are exposed to an atmosphere containing moisture, unreacted chlorosilyl groups contained in the chemisorption solution are turned into the molecules having a plurality of OH groups at the surface of the substrate by causing the dehydrochlorination reaction with water. Since these OH groups have a performance as active sites where the molecules of the silane-based surface active agent can be bonded, the molecules of the surface active agent can be bonded to the surface of the substrate via the underlayer at a high density. It is noted that the more the OH groups (active hydrogen atoms) are present on the substrate surface, the higher the density of the adsorbed molecules is, and as a result, a liquid crystal alignment layer having an excellent surface anchoring force to the liquid crystal molecules and excellent durability can be obtained.

(21) A method of manufacturing a liquid crystal display device according to the present invention may have the following construction. Since the method of manufacturing a liquid crystal display device incorporates the above-described methods of forming the liquid crystal alignment layer, the details that has already been described in the above-described methods of forming the liquid crystal alignment layer are not repeated here for the sake of brevity.

The present invention provides the method of manufacturing a liquid crystal display device comprising at least the steps of forming a solution layer on a surface of a first substrate having a plurality of electrodes formed in a matrix by contacting the chemisorption solution with the surface of the substrate in a dry atmosphere, the chemisorption solution containing a silane-based surface active agent and a nonaqueous organic solvent; evaporating the organic solvent in the solution layer in a dry atmosphere and chemisorbing molecules of the surface active agent onto the surface of the substrate; washing the substrate surface having chemisorbed molecules of the surface active agent with a washing solution comprising a nonaqueous organic solvent to remove unadsorbed molecules of the surface active agent off from the substrate surface; after the step of washing, pre-aligning the chemisorbed molecules on the substrate surface in a predetermined direction by pulling the substrate out in a predetermined direction in a dry atmosphere to drain-dry the solvent on the substrate surface and to pre-align the molecules chemisorbed on the substrate; realigning the chemisorbed molecules in a predetermined direction by irradiating the pre-aligned chemisorbed molecules with a polarized light; and assembling a liquid crystal cell by opposing the first substrate having an alignment layer formed by the step of realigning and a second substrate having a counter electrode with a predetermined gap so that each of the substrate surfaces provided with the electrode faces inwardly.

(22) In the above-described method, the step of realigning in the method of manufacturing a liquid crystal display device is such that using a polarizer and a patterned mask overlaid on the polarizer, the polarized light is irradiated a plurality of times onto each pixel having a plurality of micro-sections, in such a manner that in each time the polarized lights portioned in different directions are correspondingly applied to one of the plurality of micro-sections to form an alignment layer in which each of the plurality of micro-sections has a different realigning direction.

By employing this method, the direction of realigning can be controlled at each of the micro-sections, and a multi-domain type liquid crystal display device can be realized.

It is noted that after the steps of forming a solution layer, chemisorbing, washing, and pre-aligning, the methods as described in the foregoing methods of forming a liquid crystal alignment layer can be employed.

DETAILED DESCRIPTION OF THE PREFERRED EMBODIMENTS

Based on preferred embodiments thereof, the present invention is detailed below. It is noted here that the difference between the methods of forming a monomolecular chemisorption film and the methods of forming a liquid crystal alignment layer in accordance with the invention is that the former does not necessarily require an alignment treatment, whereas the latter requires the alignment treatment. However, the methods of forming a monomolecular chemisorption film may include the alignment treatment, which indicates that the two methods have no substantial differences therebetween. Accordingly, the description hereinbelow details examples relating to the methods of forming a liquid crystal alignment layer and of manufacturing a liquid crystal display device, in addition to the methods of forming a monomolecular chemisorption film according to the invention. It is also noted here that the term "base material" in the methods of forming a monomolecular chemisorption film is intended to include materials having any shapes in as much as the monomolecular chemisorption film can be formed on a surface thereof. The term "substrate" is, on the other hand, intended to mean materials having a shape suitable for liquid crystal displays (generally, a flat plate-like shape).

EXAMPLE 1

Figure 1:
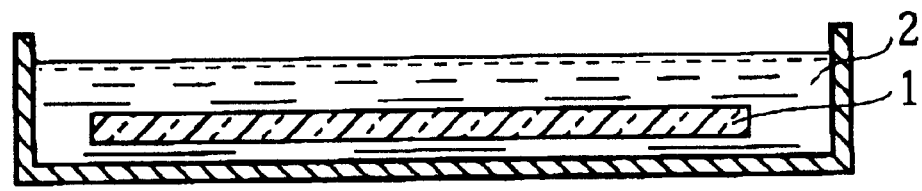
FIG. 1 is a view showing an example of the method for applying the chemisorption solution onto the base material.
Figure 2:
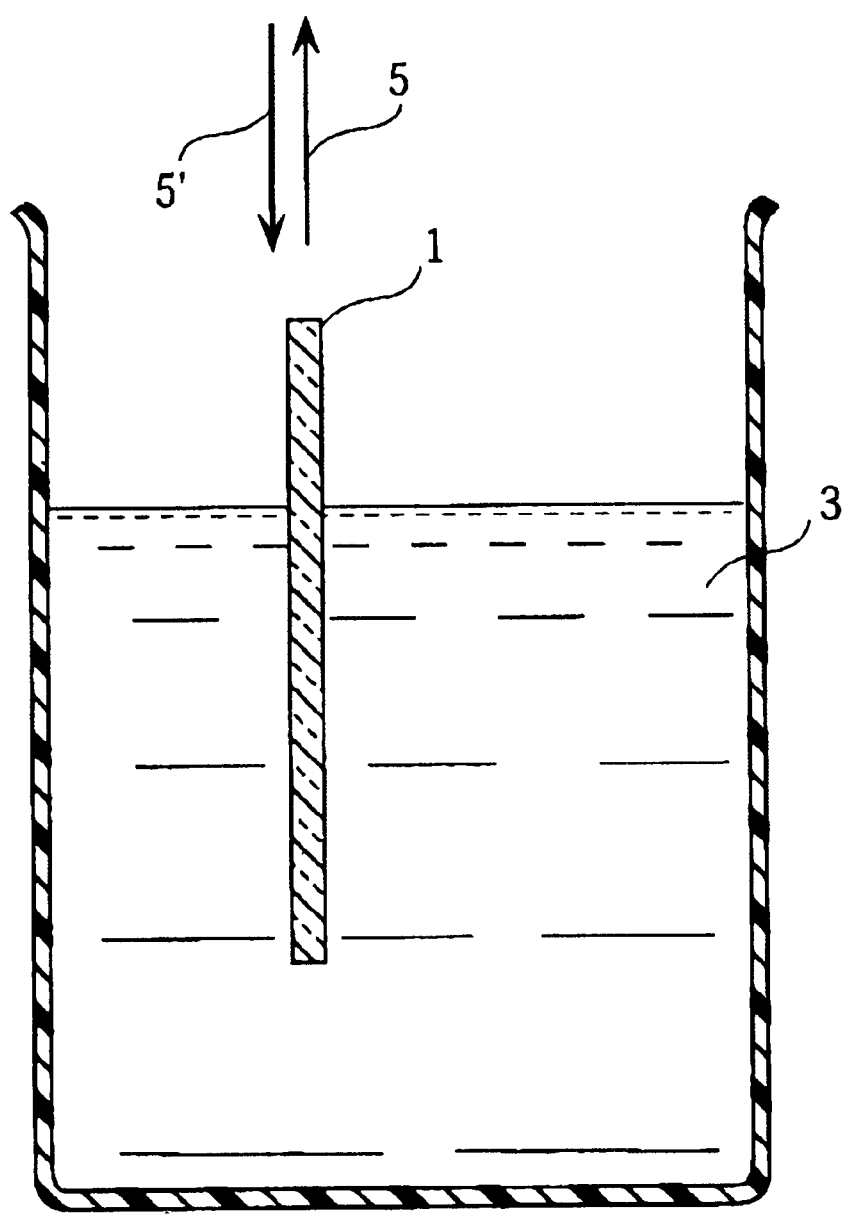
FIG. 2 is a view showing an example of the method of washing the surface of the base material on which the chemisorption film is formed.
Figure 3:
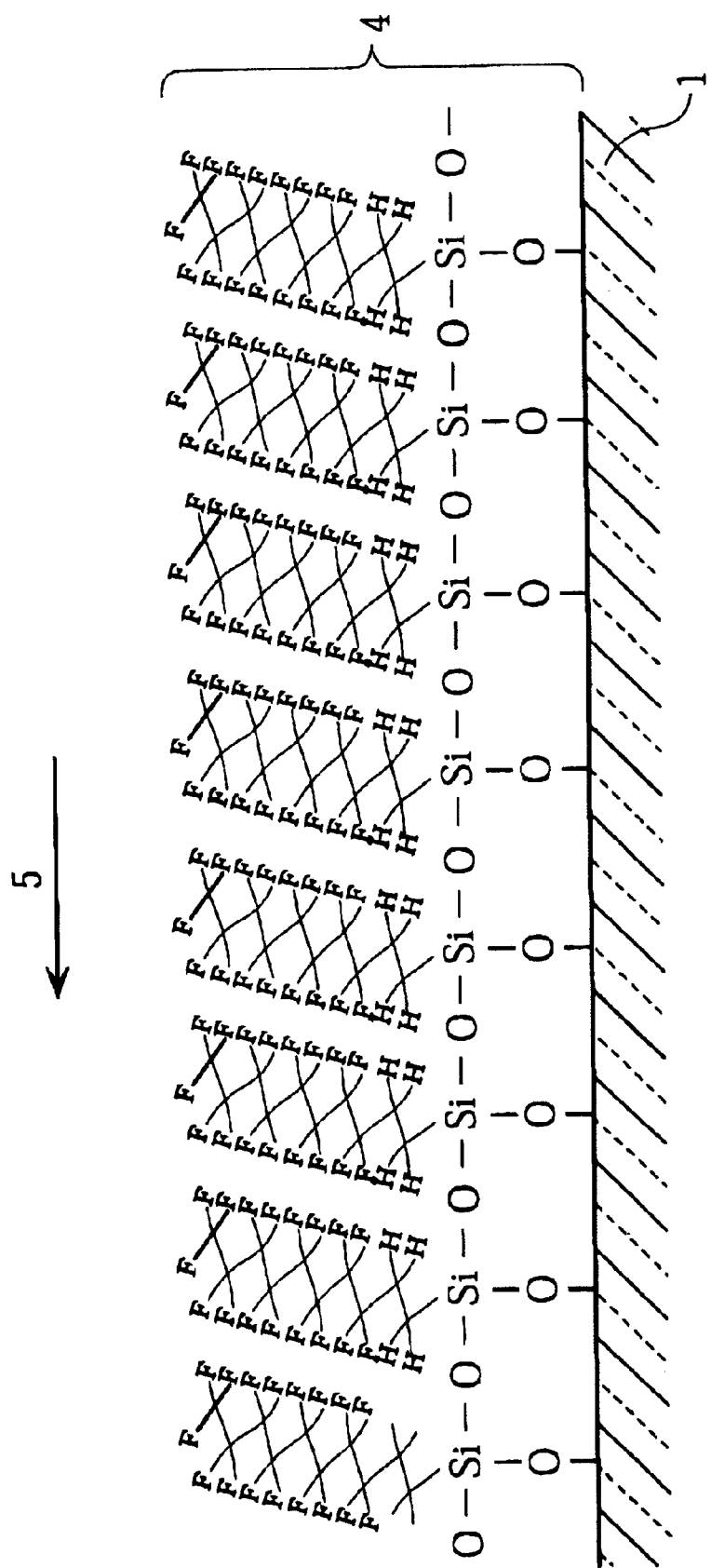
FIG. 3 is a schematic cross sectional view of the chemisorption film formed in accordance with Example 1, enlarged to a molecular level.

Referring to FIGS. 1 to 3, Example 1 according to the invention is now described below.

First, a glass substrate 1 was prepared, and the surface of the substrate was sufficiently washed and degreased. The glass substrate 1 had a multiplicity of hydroxyl groups at the surface thereof.

As a chemical adsorbate, a silane-based surface active agent was prepared. The silane-based surface active agent comprised a trichlorosilane group and a linear hydrocarbon chain group having a functional group ($CF_3$—) for decreasing a surface energy of the film incorporated at one end. The silane-based surface active agent is represented by the chemical formula $CF_3(CF_2)_7(CH_2)_2SiCl_3$.

For a nonaqueous organic solvent, a dehydrated hexamethylsiloxane (boiling point 100° C.) was prepared. In the dehydrated hexamethylsiloxane, the foregoing surface active agent was dissolved at a concentration of 1 wt. % to obtain a chemisorption solution 2.

Next, in a dry atmosphere having a relative humidity of 30% or less, the substrate 1 was immersed in the chemisorption solution 2 as shown in FIG. 1, and taken out approximately after 1 minute. Thus, a solution layer of the chemisorption solution was formed on the surface of the substrate 1.

Thereafter, the substrate 1 was placed still in the atmosphere with a temperature of 25° C. to evaporate the hexamethylsiloxane in the solution layer, and the surface active agent in the solution layer was concentrated to a concentration of 100% (accelerating the chemisorption reaction by the concentrating). It took approximately 1 minute for the concentration of the surface active agent to reach 100% in the atmosphere The thickness of the solution layer was approximately 5 $\mu$m as prepared.

After the hexamethylsiloxane having been evaporated, the substrate 1 was left still in the foregoing atmosphere for 10 more minutes (aging). Thus, a substrate wherein molecules of the surface active agent were chemisorbed on the surface thereof was obtained.

After these treatments, unadsorbed molecules on the substrate surface were washed away by immersing the chemisorbing-treated substrate 1 into chloroform 3 (washing soluvent) in which no water was contained. Thereafter, as shown in FIG. 2, the substrate 1 was pulled upwardly and taken out of the chloroform 3, and then, in a dry atmosphere having a relative humidity of 30% or less and at a temperature of approximately 25° C., the chloroform on the substrate was drain-dried by leaving the substrate in a standing condition such that a direction of pulling out the substrate (the direction shown by the arrow 5 in FIG. 2) was an upward direction in the standing condition (pre-aligning treatment). In this case, a direction of drain-drying results in the direction shown by the arrow 5' in FIG. 2.

Thereafter, the surface of the substrate 1 was exposed to an air atmosphere having a relative humidity of 65% (an air atmosphere containing moisture), and chlorosilane groups in the molecules remaining on the monomolecular layer were reacted with water. Regarding the air atmosphere containing moisture, the air having a relative humidity of 50% or more was found to be preferable.

By the treatments described above, there was formed a chemisorption film 4, in which the molecules of the chlorosilane-based surface active agent represented by the chemical formula $CF_3(CF_2)_7(CH_2)_2SiCl_3$ were bonded to hydroxyl groups at the substrate surface by a siloxane bond (—SiO—) and the adsorbed molecules were pre-aligned in a predetermined direction (drain-drying direction).

The film thickness of the chemisorption film 4 was approximately 1 nm, and the contact angle of the film to water was approximately 120°. The critical surface energy was approximately 10 mN/m according to the measurement by Zisman's plot method utilizing contact angles. Further, strength of the chemisorption film 4 against peeling off was examined according to JIS cross cut method, and as a result, it was confirmed that no film was peeled off. It was also confirmed by an analysis using FTIR (Fourier transform infrared spectroscopy) measurement that carbon chains of the adsorbed molecules were aligned in the drain-drying direction (the arrow 5' in FIG. 3).

Now, the method described above is further detailed referring to the following Chemical Formulae 1 and 2. In the present specification, a process of chemisorption reaction implemented by evaporating solvent is referred to as an accelerating the chemisorption reaction by the concentrating, and a process of allowing the reaction to further continue by placing a substrate in a dry atmosphere for a predetermined time after the evaporation of the solvent having finished is referred to as an aging.

In both of these reaction processes, molecules of the surface active agent in the chemisorption solution are bonded to hydrophilic groups (active hydrogen) at the substrate surface by a siloxane bond (see Chemical Formula 1 below). In the accelerating the chemisorption reaction by the concentrating, the absorption solution is gradually concentrated on the substrate. As a consequence, the hydroxyl groups at the surface of the substrate and the surface active agent molecules are smoothly bonded, and the chemisorption reaction was accelerated. The aging, on the other hand, has a technical significance of ensuring a sufficient time for the reaction between the surface active agent and the hydroxyl groups at the surface of the substrate. In the aging, only the surface active agent molecules are left on the substrate (that is, the concentration of the surface active agent is 100%), and thereby the chemisorption reaction can be accelerated and the surface active agent molecules can be adsorbed smoothly onto the unreacted spots on the substrate. Accordingly, in the method of Example 1, in which the chemisorption reaction was accelerated by the concentrating and the aging, the chemisorption time could be reduced remarkably.

By contrast, in conventionally employed immersing reaction methods in which the substrate is immersed in a chemisorption solution having a low concentration, a longer reaction time such as several hours is required since the density of adsorbed molecules adjacent to the substrate surface is low and the solvent is present between the substrate surface and the adsorbed molecules. Even if a solution having a high concentration is employed at the initial stage, further disadvantages are induced such that hydroxyl groups at the substrate surface and the surface active agent molecules are not smoothly bonded, and that an utilization efficiency of the adsorbate is reduced.

In order to form a uniform chemisorption film without defect, it is ideal that the amount of the surface active agent molecules to be applied should be such an amount that neither too many nor too few of the surface active agent molecules are chemically bonded to hydrophilic groups at the substrate surface. However, since it is difficult to equalize the number of the surface active agent molecules in the solution layer to the number of active hydrogen groups at the substrate surface, a solution having surface active agent molecules in a somewhat excessive amount must be applied onto the substrate surface, This produces the surface active agent molecules that cannot react with the substrate (unadsorbed molecules) remaining on the substrate surface, at a point of time where the chemisorption reaction is completed. Thus, in Example 1, the substrate is washed with a washing solution at the stage where the chemisorption reaction is completed. By washing the substrate, the unadsorbed molecules remaining on the substrate are removed, and therefore it is made possible to form a monomolecular film in which substantially adsorbed molecules alone are arrayed into one monomolecular layer. In addition, in Example 1, the washing solution attached on the substrate surface is drain-dried by disposing the substrate in a standing condition in a predetermined direction, and by this treatment, the adsorbed molecules are aligned in a drain-drying direction (the direction shown by the arrow 5').

Thereafter, a treatment of exposing the adsorbed molecules to moisture is performed. It is considered that by this treatment, SiCl groups in the adsorbed molecules cause dehydrochlorination reaction with water, and thereby the adsorbed molecules are bonded each other by a siloxane bond, as shown in the following Chemical Formula 2 and in FIG. 3.

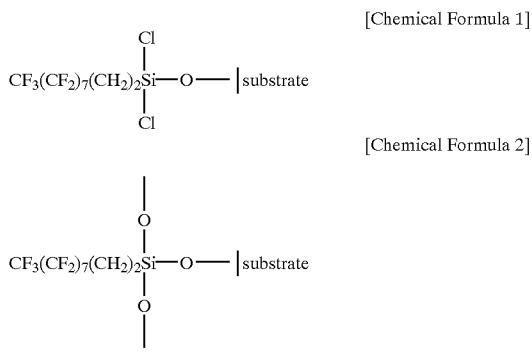

In the method of Example 1 described above, the time required for the chemisorption reaction was reduced to 12 minutes (including the time for immersing the substrate to apply the solution), which was remarkably shortened in comparison with conventional immersing reaction methods, which require 1 to 2 hours for the reaction.

EXAMPLE 2

A glass substrate (at which surface many of hydroxyl groups were presented) having a transparent electrode composed of, for example, ITO (Indium Tin Oxide) on a surface thereof was prepared, and the surface was sufficiently washed and degreased Meanwhile, two surface active agents were prepared to prepare a two-component monomolecular chemisorption film. A silane-based surface active agent having a trichlorosilane group and a linear hydrocarbon chain group in which a functional group ($CH_3-$) for controlling a surface energy of the film was incorporated at one end, which silane-based surface active agent is represented by the chemical formula $CH_3(CH_2)_{14}SiCl_3$, and another silane-based surface active agent in which a photoreactive group ($C_6H_5CH=CHCOC_6H_4-$: chalconyl group) was incorporated, which surface active agent represented by the chemical formula $C_6H_5CH=CHCOC_6H_4O$ $(CH_2)_6SiCl_3$, were mixed at a molar ratio of 1:1. The two surface active agents thus prepared were dissolved in dehydrated hexamethylsiloxane (boiling point 100° C.) at a concentration of 1 wt. %, and a two-component chemisorption solution was prepared.

Next, in the manner analogous to that in Example 1, a solution layer composed of the foregoing two-component chemisorption solution was formed on the substrate by immersing the substrate in the two-component chemisorption solution for 1 minute and thereafter pulling the substrate upwardly and taking it out from the solution. Thereafter, the silicone as the solvent was evaporated from the solution layer (accelerating the chemisorption reaction by the concentrating). Further, after the silicone having been completely evaporated (approximately after 1 minute), the substrate was left for 5 minutes to allow the chemisorption reaction to proceed (aging). Thereafter, the substrate was immersed in a vessel filled with a dehydrated n-hexane to wash away unadsorbed molecules, and then pulled upwardly out from the vessel. The substrate was drain-dried by placing the substrate in a standing condition such that a direction of pulling out the substrate was an upward direction in the standing condition. These treatments were performed in a dry atmosphere having a relative humidity of 30% or less and at a temperature of 25° C.

Thereafter, the substrate surface was exposed to an air atmosphere containing moisture so that unreacted SiCl groups react with water. Thus, a chemisorption film 14 (pre-aligned film), in which two types of surface active agent molecules were monolayerly chemisorbed onto the substrate, was prepared.

Figure 4:
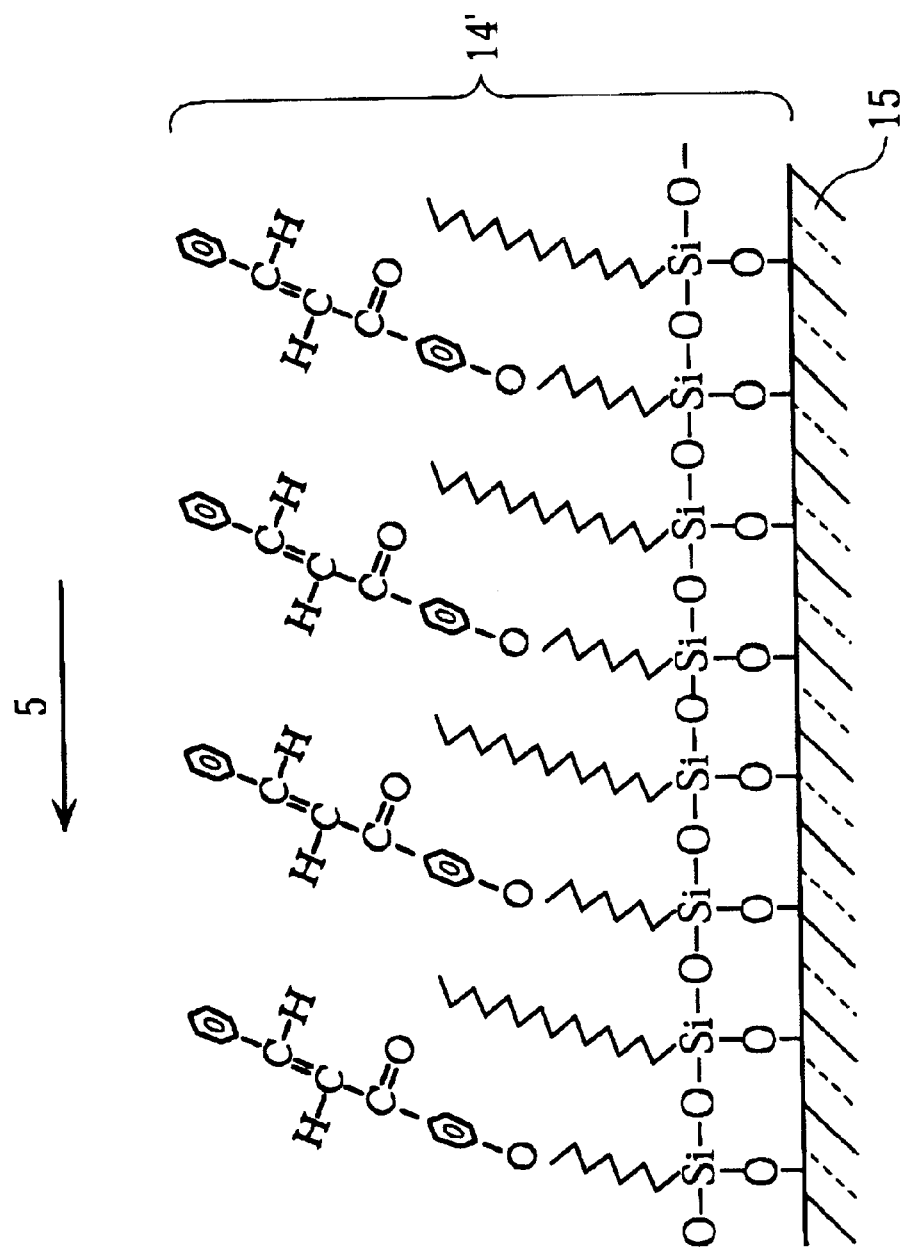
FIG. 4 is a schematic cross sectional view of the chemisorption film after pre-aligning in accordance with Example 2, enlarged to a molecular level.

The alignment of the adsorbed molecules in this chemisorption film 14 was examined in the same manner as in the foregoing Example 1. This revealed that the adsorbed molecules were pre-aligned in a direction opposite to the direction of pulling out, i.e., along the direction of drain-drying (see FIG. 4). The film thickness was approximately 1.7 nm. The critical surface energy of the chemisorption film was approximately 28 mN/m.

Additionally, using two substrates each having a pre-aligned film produced according to the above-described method, a liquid crystal test cell was prepared. In the test cell, the pre-alignment directions for the substrates were antiparallel to each other, and the cell gap was 20 μm. A nematic liquid crystal (ZLI4792 available from Merck & Co., Inc.) was filled into the cell, and using visible rays and polarizers, alignment state of the liquid crystal molecules in the cell was examined. As a result, it was confirmed that the liquid crystal molecules were aligned in the direction of pre-alignment (the direction of drain-drying) in the pre-aligned film (the chemisorption film subjected to the pre-aligning treatment) at a pretilt angle of approximately 4° with respect to the substrate.

In the foregoing series of processes, the chemical reactions of the surface active agent are analogous to the foregoing Example 1. Specifically, in the reaction between the substrate surface and the surface active agent, the bonds as shown in the following Chemical Formulae 3 and 4 are initially formed at a ratio of approximately 1:1. Then, after the washing with the solvent, the bonds as shown in the following Chemical Formulae 5 and 6 are formed by exposing the substrate to an air atmosphere containing moisture.

In Example 2 as well as in the foregoing Example 1, the chemisorption reaction method comprising the accelerating the chemisorption reaction by the concentrating and the aging was employed, and the chemisorption reaction time was remarkably reduced to 7 minutes, which usually takes 1 to 2 hours.

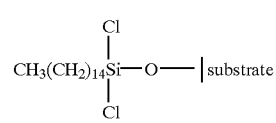
[Chemical Formula 3]

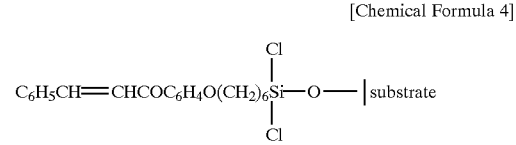
[Chemical Formula 4]

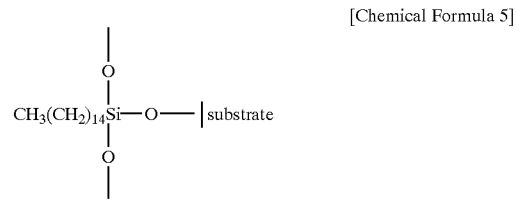
[Chemical Formula 5]

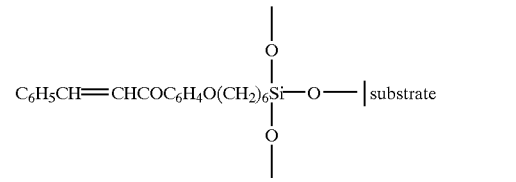
[Chemical Formula 6]

Realignment Process

Following the foregoing treatment, the pre-aligned film was subjected to a realignment treatment. By using FIGS. 5 and 6, the process of the realignment treatment is detailed below. A polarizer 6 (HNP'B, available from POLAROID) was overlaid on the substrate provided with the pre-aligned film, and the substrate surface was irradiated with an ultraviolet ray having a wavelength of 365 nm (i-line) at an intensity of 400 mJ/cm² in such a manner that the direction of polarization 13 and the direction of drain-drying 5' cross at angles of 87° or at angles of 93°. An extra-high-pressure mercury-vapor lamp having a wattage of 500 W (3.6 mW/cm² after transmitting the polarizer) was employed as a light source 7 for producing the polarized ultraviolet rays.

Figure 5:
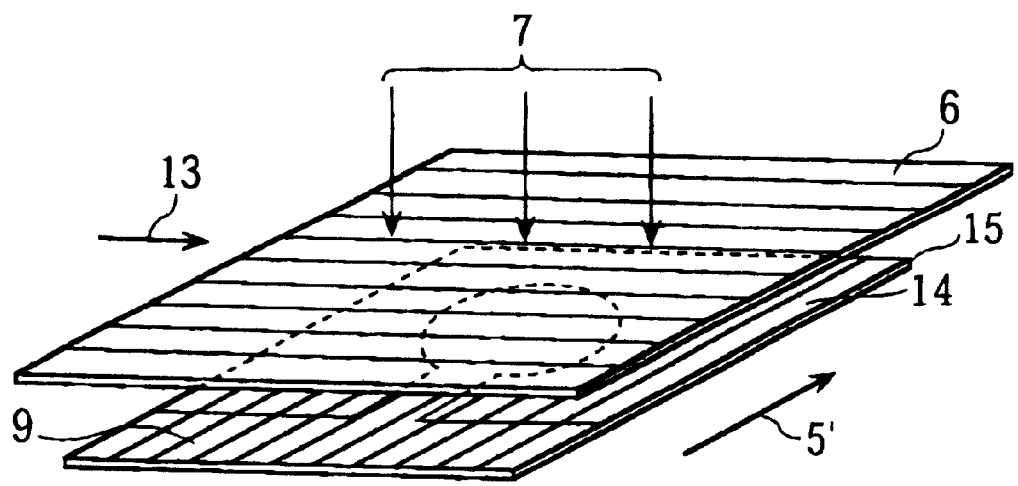
FIG. 5 is a schematic view of describing the step of realigning by irradiating the substrate surface with a polarized light.
Figure 6:
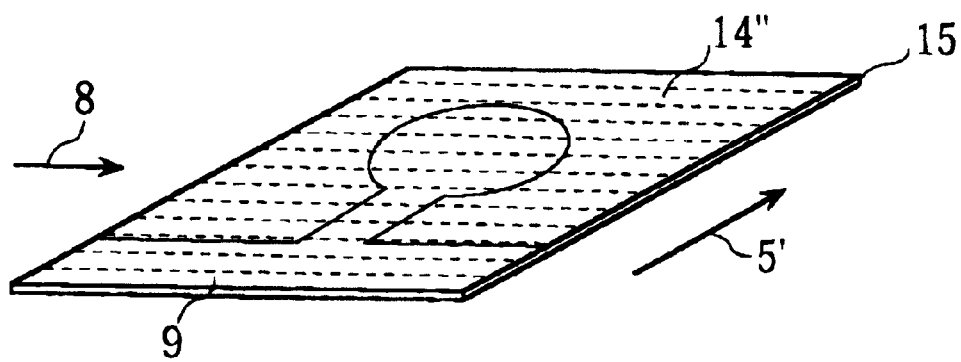
FIG. 6 is a schematic view showing the surface of the substrate after irradiating with the polarized light.
Figure 7:
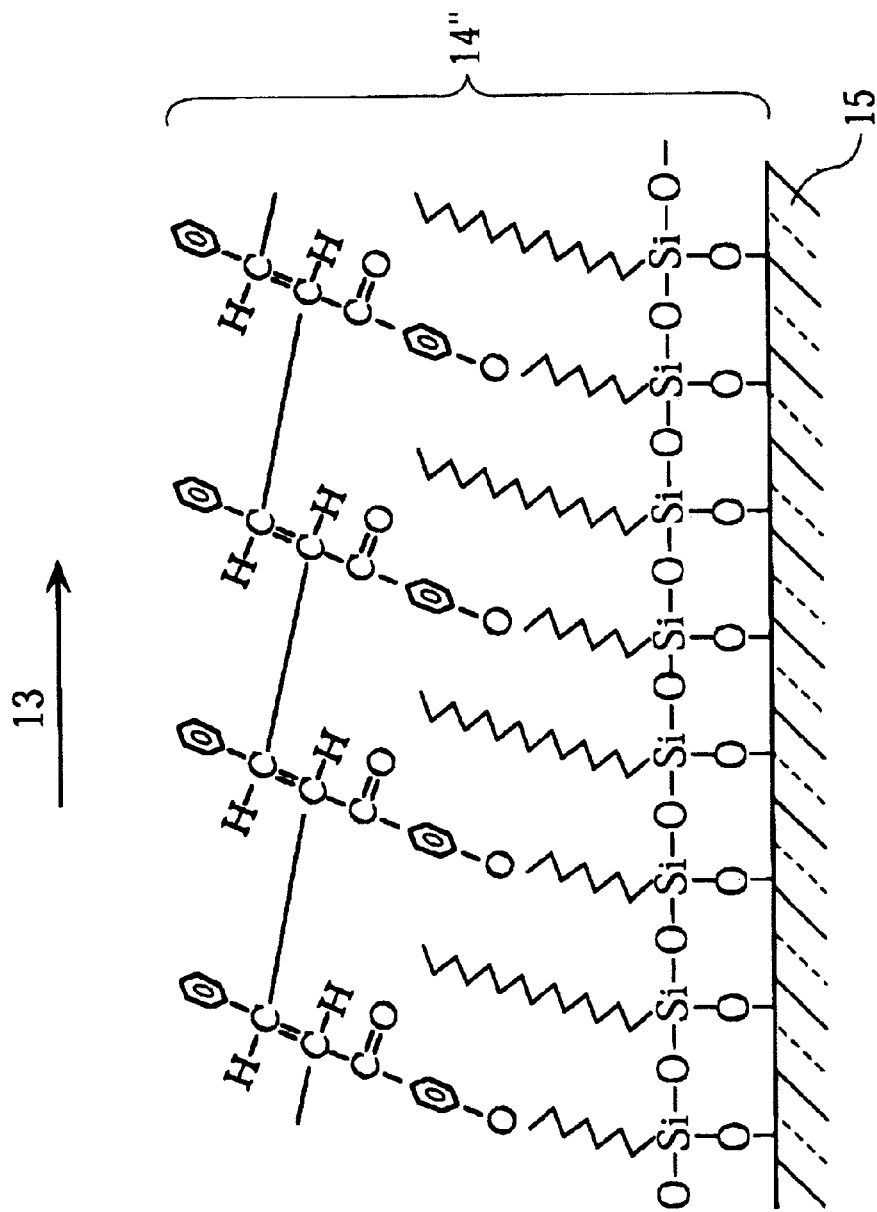
FIG. 7 is a schematic cross sectional view of the chemisorption film after realigning in accordance with Example 2, enlarged to a molecular level.

FIG. 5 schematically shows a state of the polarized light irradiation, and FIG. 6 schematically shows a state of the substrate surface after irradiated with the polarized light. FIG. 7 schematically shows an cross-sectional view of a chemisorption film 14' (realigned film) after irradiated with the polarized light, enlarged to a molecular level.

FIGS. 5 to 7 reflect the results of FTIR spectrometry and the results of the tests using the test cells in which the monomolecular films were formed in the same manner as in Example 1. It was confirmed by the FTIR spectrometry performed as in Example 1 that two types of adsorbed molecules as shown by Chemical Formulae 5 and 6 were chemisorbed on the substrate surface in a mixed manner, and that the adsorbed molecules having the photoreactive groups ($C_6H_5CH$=$CHCOC_6H_4$—) were linked or polymerized each other at double bonds of C=C (see Chemical Formula 7, and FIG. 7). It was also confirmed that the adsorbed molecules represented by Chemical Formula 5 caused no photochemical reaction by the treatment of irradiating with the ultraviolet rays. In addition, it was observed in the test cell that the liquid crystal molecules were aligned along the direction of polarization of the light, that the pretilt angle was approximately 40°, and that the disclination in the alignment of the liquid crystal molecules was less than that in the pre-aligned film. Regarding the surface tension, the critical surface energy and the film thickness, the values were the same as those of the pre-aligned film, which shows that the ultraviolet irradiation caused no influence on the values.

It is noted that in FIGS. 4 through 7, the reference numeral 14 denotes the chemisorption film subjected to the pre-aligning treatment, the numeral 14' denotes the adsorbed molecule groups after the pre-aligning treatment, the numeral 15 denotes the substrate, the numeral 6 denotes the polarizer, the numeral 7 denotes the irradiation rays, the numeral 9 denotes the transparent electrode, the numeral 14" denotes the realigned chemisorption film (realigned film, liquid crystal alignment layer), and the numeral 8 denotes the direction of realignment.

[Chemical Formula 7]

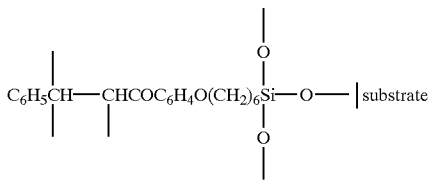

EXAMPLE 3

In Example 3, a monomolecular chemisorption film was formed in such a manner that an underlayer was formed on the substrate surface in order to increase the number of the OH groups at the substrate surface, and thereafter the surface active agent molecules were chemisorbed thereon. Specific processes are as follows.

Figure 8:
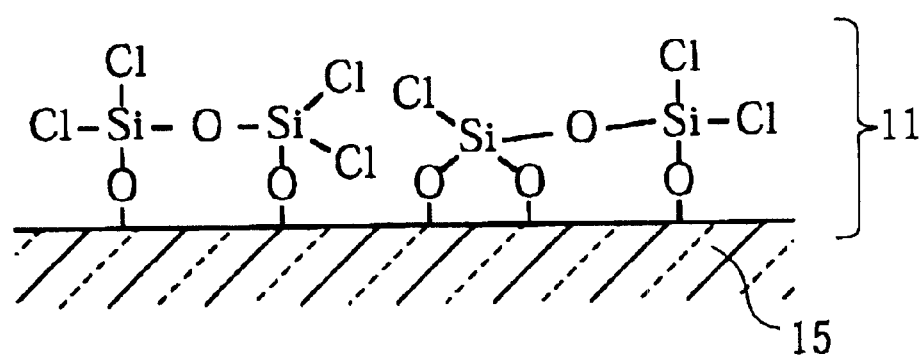
FIG. 8 is a schematic cross sectional view of the chemisorption film before the exposure to an atmosphere containing moisture, enlarged to a molecular level, in the step of forming an underlayer of Example 3.

For a silyl compound comprising a plurality of chloro groups, a compound represented by the chemical formula $Cl_3SiOSiCl_3$ was prepared, and then the compound was dissolved in dehydrated toluene at a concentration of 1 wt. % to prepare a solution for forming an underlayer. The procedure and principle for forming the underlayer are identical to that as detailed in Example 1. First, in a dry atmosphere having a relative humidity of 30% or less, the substrate was immersed in the above-described solution for forming an underlayer for 1 minute and thereafter pulled out of the solution, and the toluene was evaporated in the atmosphere for 5 minutes to cause the accelerating the chemisorption reaction by the concentrating, and further the substrate was subjected to the aging for 5 minutes. In the processes of these reactions, $Cl_3SiOSiCl_3$ was bonded to hydroxyl groups (—OH) at the substrate surface, as shown in FIG. 8.

Figure 9:
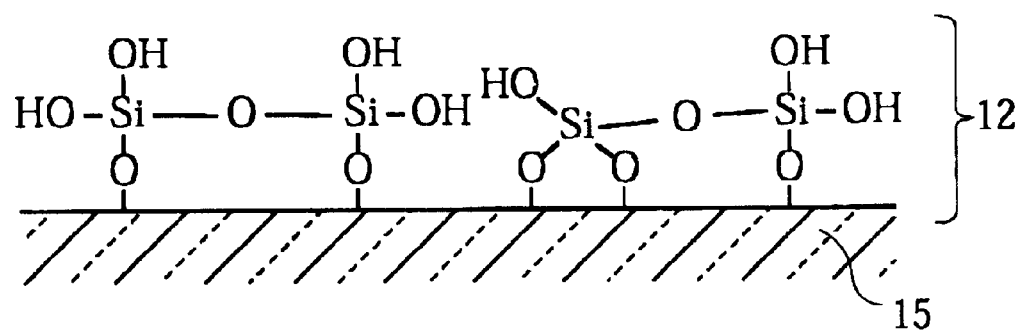
FIG. 9 is a schematic cross sectional view of the chemisorption film after the exposure to an atmosphere containing moisture, enlarged to a molecular level, in the step of forming an underlayer in Example 3.

Subsequently, the substrate surface was washed with dehydrated chloroform and exposed to an air atmosphere containing moisture. Thereby, unreacted —SiCl groups cause dehydrochlorination reaction with water in which unreacted Cl is substituted by OH, and thus an underlayer comprising a multiplicity of hydroxyl groups are formed. FIG. 9 shows a schematic view of the underlayer, enlarged to a molecular level. It is to be noted that when $Cl_3SiOSiCl_3$ is used, it is possible to increase the number of hydroxyl groups at the substrate surface to more than twice as large as that at the initial stage. In addition, this underlayer is remarkably thin since the layer is a monomolecular film. Accordingly, the underlayer does not increase the thickness of the substrate, and moreover does not detach from the substrate since the layer is securely bonded to the substrate by a siloxane bond.

Using the chemisorption solution as described in Example 2 and the substrate having the underlayer thereon, a chemisorption film was formed. The resulting chemisorption film (the film thickness 1.8 nm) exhibited a high density of the adsorbed molecules and excellent oil repelling property.

Using the substrate having the chemisorption film thereon, the alignment state of the liquid crystal molecules was examined by using the test cell method in the same manner as in Example 2. The result of the examination showed that the liquid crystal molecules are aligned along the direction of pre-alignment with a pretilt angle of approximately 5° with respect to the substrate.

In Example 3, the accelerating the chemisorption reaction by the concentrating and the aging were employed to form the underlayer, and therefore the time required for forming the underlayer was remarkably short (11 minutes). Note that if conventional immersing reaction methods are employed and $Cl_3SiOSiCl_3$ was used for forming the underlayer, the reaction with the substrate takes approximately 1 to 2 hours.

It is to be noted here that substances for forming the underlayer are not limited to the foregoing substances. Other usable examples include various compounds having functional groups to be bonded with the substrate surface such as silyl halide groups, isocyanatosilyl groups and alkoxysilyl groups. Of these examples, silyl compounds comprising a plurality of chloro groups are preferable in view of bonding properties with the substrate, durability, and handleability etc. Example of such silyl compounds include Cl—$(SiCl_2O)_n$—$SiCl_3$ (where n is an integer, preferably in the range of 0 to 3), in addition to $Cl_3SiOSiCl_3$ shown above.

EXAMPLE 4

As the surface active agent, five types of different surface active agent mixtures were prepared by using a compound A represented by the chemical formula $ClSi(CH_3)_2OSi(CH_3)_2OSi(CH_3)_2OSi(CH_3)_2Cl$ and a compound B represented by the chemical formula $C_6H_5CH$=$CHCOC_6H_4O(CH_2)_6SiCl_3$. The mixing ratios of the surface active agent mixtures were as follows: the component A alone (100:0), three types of two-component mixtures of the components A and B (80:20, 50:50, 20:80), and the component B alone (0:100). Subsequently, using the five types of surface active agents, five types of realigned films liquid crystal alignment layers) were prepared in the same manner as in Example 2. Then, the critical surface energies and pretilt angles were measured in the same manner as in Example 2, in order to evaluate the influence of mixing ratios of the mixtures upon the critical surface energies and pretilt angles.

The measurement results are shown in Table 1 below. From Table 1, it is understood that by adjusting mixing ratios of the component A and the component B, the critical surface energies of the realigned films (liquid crystal alignment layers) can be controlled to be in the range of 23 mN/m to 37 mN/m, and that the pretilt angles can be controlled to be in the range of 2 to 87°.

TABLE 1

Critical Surface Energy and Pretilt Angle Depending on Mixing Ratio A:B

| Mixing Ratio A:B (Molar Percentage) | 100:0 | 80:20 | 50:50 | 20:80 | 0:100 |
|---|---|---|---|---|---|
| Critical Surface Energy (mN/m) | 23 | 25.8 | 30 | 34.2 | 37 |
| Pretilt Angle | 87° | 81° | 9° | 5° | 2° |

EXAMPLE 5

As the surface active agent, three types of different surface active agent mixtures were prepared using a compound C represented by the chemical formula $CH_3CH_2C^*HCH_3CH_2OCO(CH_2)_{10}SiCl_3$ (C*: asymmetric carbon) and the foregoing compound B represented by the chemical formula $C_6H_5CH=CHCOC_6H_4O(CH_2)_6SiCl_3$. The mixing ratios of the three types of surface active agent mixtures were as follows: the compound C alone (100:0), two types of two-component mixtures of the compounds C and B (80:20, and 20:80). Then, three types of different realigned films (liquid crystal alignment layers) were produced in the same manner as in Example 2 except that the above-described three types of surface active agent mixtures were used, and the same evaluation as in Example 4 was performed.

The result of the measurement is shown in Table 2 below. Table 2 also shows the critical surface energy and other values of the compound B alone, which were measured in the foregoing Example 4.

From Table 2, it is understood that by adjusting mixing ratios of the component A and the component B, the critical surface energies of the realigned films (liquid crystal alignment layers) can be controlled in the range of 21 mN/m to 37 mN/m and the pretilt angles can be controlled to be in the range of 2 to 90°.

TABLE 2

Critical Surface Energy and Pretilt Angle Depending on Mixing Ratio A:B

| Mixing Ratio A:B (Molar Percentage) | 100/1 | 80/20 | 20/80 | 0/100 |
|---|---|---|---|---|
| Critical Surface Energy (mN/m) | 21 | 24 | 34 | 37 |
| Pretilt Angle | 90° | 77° | 7° | 2° |

The results in Examples 4 and 5 demonstrate that the methods according to the present invention can be effectively employed to efficiently produce various liquid crystal alignment layers with various critical surface energies and pretilt angles.

EXAMPLE 6

In Example 6, a method of manufacturing a liquid crystal display device employing the accelerating the chemisorption reaction by the concentrating is detailed.

Figure 10:
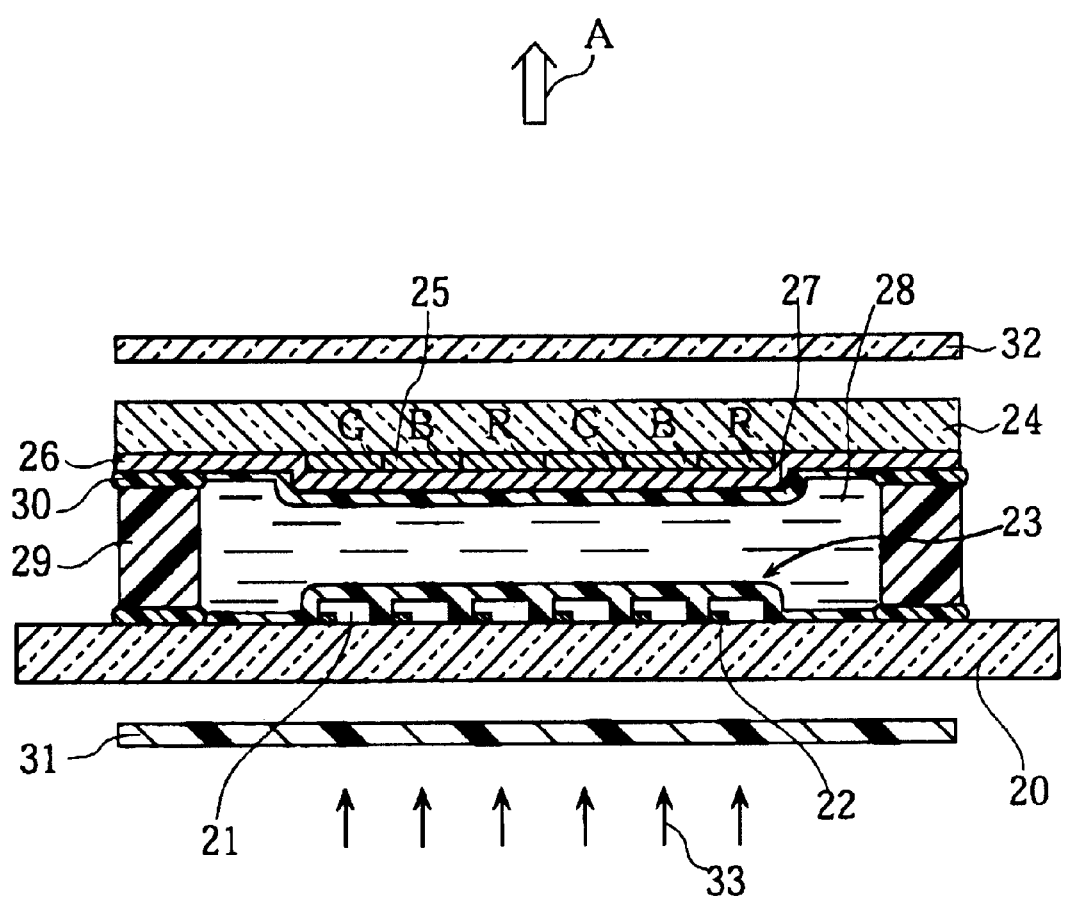
FIG. 10 is a schematic cross sectional view of the liquid crystal display device according to Example 6.

First, the device construction of the liquid crystal display device of Example 6 is described with reference to FIG. 10. FIG. 10 schematically shows the construction in a cross sectional view of the liquid crystal display device. In FIG. 10, the reference numeral 20 denotes a first substrate, the numeral 21 denotes a group of first electrodes formed in a matrix array on the first substrate 20, the numeral 22 denotes a transistor group for driving the group of first electrodes 21, and the numeral 23 denotes a first liquid crystal alignment layer over the group of first electrodes. The reference numeral 24 denotes a second substrate, the numeral 25 denotes a group of color filters, the numeral 26 denotes a group of second electrodes (common electrodes) opposed to the group of first electrodes 21, the numeral 27 denotes a second liquid crystal alignment layer on the group of second electrodes, the numeral 28 denotes a liquid crystal layer, the numeral 29 denotes a spacer, the numeral 30 denotes an adhesive part, the numerals 31 and 32 denote a polarizer, and the numeral 33 denotes a backlight.

The primary elements in manufacturing the liquid crystal display device are described. In the liquid crystal display device, the liquid crystal alignment layers (realigned films) 23, 27 were respectively formed on the first substrate 20 having the group of first electrodes 21 and the group of transistors 22, and on the second substrate 26 having the group of color filters 24 and the common electrodes 16. The conditions of manufacturing these liquid crystal alignment layers were the same as Example 2 except that the two-component chemisorption solution in which the silane-based surface active agent represented by the chemical formula $CH_3(CH_2)_{14}SiCl_3$ and the silane-based surface active agent represented by the chemical formula $C_6H_5CH=CHCOC_6H_4O(CH_2)_6SiCl_3$, both used in Example 2 as well, were mixed at a molar ratio of 1:4. The critical surface energy of the alignment layer after the realignment treatment was 34 mN/m (35 mN/m after the pre-aligning treatment).

The process for constructing the liquid crystal display device is now described. The substrates 20 and 24 having the alignment layers thereon produced in the above-described manner were opposed so that the alignment directions in the two alignment layers were perpendicular to each other, then spacers 28 were interposed between the substrates to form a cell gap of approximately 5 μm, and the substrates were bonded with an adhesive (adhesive part 29) to form a cell. Thereafter, a nematic liquid crystal (ZLI7492 available from Merck & Co., Inc.) was injected into the cell, and the polarizers 31 and 32 were respectively disposed outside the substrates 20 and 24 in crossed Nicols. Thus, a 90° twisted-nematic mode liquid crystal display device was produced. In this device, the pretilt angle of the liquid crystal molecules was 4°.

This liquid crystal display device was irradiated with the backlight 30 onto the entire surface and driven by video signals, and as a result, it was confirmed that clear images were displayed in the direction of the arrow A.

It is noted that the conditions other than the method for forming the liquid crystal alignment layers, for example, the method for the forming the transistors and the electrodes, are not particularly restricted, and various known methods may be employed for the production.

EXAMPLE 7

A liquid crystal display device was produced in the same manner as in the foregoing Example 6 except that a multi-domain alignment type liquid crystal alignment layer was employed. The specific process is as follows. In the method of forming the chemisorption film as described in Example 2, there was prepared a mask having a light blocking pattern such that a polarized light is applied to only one of four groups of the divided regions each in which a single pixel is divided into four checkered-pattern-like regions. Thereafter, the mask was overlaid on the polarizer so that at each time of the ultraviolet irradiation, the group of the divided region to be irradiated becomes different, and thereby the four regions were irradiated each with a ultraviolet ray having a different direction of polarization. Thus, by irradiating four times with the ultraviolet rays, a multi-domain alignment type liquid crystal alignment layer, in which a single pixel comprises four regions each having a different alignment direction from each other, was produced. The four divided regions were disposed in a checkered-pattern-like arrangement in a section corresponding to a single pixel.

Using a substrate having the so-formed liquid crystal alignment layer thereon, a liquid crystal display device of Example 7 was produced in the same manner as in Example 6 except for the provision of the so-formed liquid crystal alignment layer. The liquid crystal display device thus produced was driven in the same manner as described in Example 6, and as a result, it was confirmed that the viewing angle was remarkably improved.

Supplementary Remarks (1) It is preferable that the accelerating the chemisorption reaction by the concentrating, and the aging, and the pre-aligning the molecules of the surface active agent by the drain-drying treatment, and the reaction for forming the underlayer should be carried out at a temperature of 5 to 80° C. The reason is as follows. If the temperature is lower than 5° C., the reactivity between the surface active agent molecules and the substrate and of evaporation of the solvent are reduced, and thereby much more time is required until the reactions are completed. On the other hand, if the temperature is higher than 80° C., the solvent evaporates too quickly and the viscosity of the solution increases too soon, and thereby the formation of uniform films becomes difficult and also there are incurred such disadvantages that the solvent is brought to the boil and that the surface active agent might be decomposed.

Regarding the temperature for drain-drying, the same temperature range is preferred, since if the temperature is lower than 5° C., the pre-alignment takes much more time whereas if the temperature is higher than 80° C., the washing solution completely evaporates before the pre-alignment becomes sufficient.

(2) Although in the foregoing Examples, hexamethylsiloxane (Example 1), octamethylsilicone (Examples 2 and 4 to 7) and toluene (Example 3) are described as the nonaqueous organic solvent for diluting the surface active agent, the solvent for diluting is not limited thereto. Preferable examples for the solvent for diluting include nonaqueous organic solvents in which surface active agents can be dissolved, the solvents having a boiling point of 100 to 250° C. The solvents having such a boiling point are suitable for the accelerating the chemisorption reaction by the concentrating. In addition, nonaqueous organic solvents containing alkyl groups, fluorocarbon groups, chlorocarbon groups, and siloxane groups are more preferable since such solvents have excellent compatibility with silane-based surface active agents.

(3) The foregoing solvent for diluting may also be used for the solvent for washing. Nonaqueous organic solvents containing alkyl groups, a fluorocarbon groups, chlorocarbon groups and a siloxane groups are preferable since such solvents can efficiently remove the unadsorbed surface active agents. It is noted that the solvent for washing may have a boiling point lower than 100° C.

(4) Although in the foregoing Examples, a technique in which the substrate is immersed in the chemisorption solution and thereafter pulled out is described as a method of applying the chemisorption solution on the substrate surface, the method of applying is not limited thereto. For example, an offset printing, a screen printing, and a roll coating may be employed, and such methods are preferable in that an appropriate amount of the chemisorption solution can be uniformly coated.

(5) Although the foregoing Examples describe the realignment performed by irradiating with a polarized light, the realignment may be performed by rubbing with the use of a rubbing roller, in place of the use of the polarized light. It is also possible to perform the pre-alignment by using the rubbing roller.

(6) In the foregoing Examples, the chemisorption reaction was performed in a dry atmosphere having a relative humidity of 30% or less. When the chemisorption reaction was performed in an atmosphere having a relative humidity of 35% or higher, turbidity was caused in the formed films and the turbidity was not able to be removed by washing with the use of the washing solution.

(7) Although in each of the foregoing Examples, the silane based surface active agent having linear carbon chains or linear siloxane chains, and chlorosilyl groups, is employed as the surface active agent, the surface active agents usable in the present invention are not limited thereto. For example, it was confirmed that a surface active agent having alkoxysilyl groups or isocyanatosilyl groups may be used, although the reaction rate is a little reduced.

(8) Example 2 describes a mixture of the silane-based surface active agent in which a carbon chain length is —$(CH_2)_{14}$— and the silane-based surface active agent having a photoreactive group in which a carbon chain length is —$(CH_2)_6$—. However, the carbon chain lengths are not limited thereto. For example, in the case of using two or more kinds of surface active agents having a different carbon chain length of — $(CH_2)_n$—(where n is an integer of 1 to 25), substantially the same result as in Example 1 was obtained. That is, such surface active agents can also be pre-aligned by drain-drying and realigned by irradiating with a polarized light. In addition, a surface active agent in which linear siloxane chains (—$(Sio)_n$— (where n is an integer of 1 to 15)) are substituted for hydrocarbon chains may also be used.

(9) In Example 2, by varying a molar ratio of mixing $CH_3(CH_2)_{14}SiCl_3$ and $C_6H_5CH=CHCOC_6H_4O(CH_2)_6SiCl_3$ within the range of 1:0 to 0:1, it was made that the critical surface energy was changed in the range of 24 to 37 mN/m, and that the pretilt angle of the liquid crystal molecules was controlled in the range of 87 to 2°.

(10) In addition, when a surface active agent comprising fluorine, for example, $CF_3(CF_2)_7(CH_2)_2SiCl_3$ was added as a chemisorption compound in place of the foregoing $CH_3(CH_2)_{14}SiCl_3$, it was possible that the critical surface energy was decreased to 14 mN/m. When it was added at a rate of 20 wt. %, the pretilt angle of the liquid crystal was approximately 90°. A liquid crystal display device employing such an alignment layer was produced, and it was confirmed that quick and uniform alignment transition of the liquid crystal molecules was achieved.

(11) In Example 2 etc., the i-line in an extra high pressure mercury lamp, having a wavelength of 365 nm is used for the light source of the polarized light, but the light source is not limited to ultraviolet rays having such a wavelength, but may be other light rays having wavelengths suitable for the light absorption property of the adsorbed molecules. For example, light rays having a wavelength of 436 nm, 405 nm or 254 nm, or a light with a wavelength of 248 nm obtained by KrF excimer laser may be employed.

In particular, light rays having a wavelength of 248 nm or 254 nm are preferable since they tend to be readily absorbed by most substances, thereby exhibiting a high energy efficiency.

(12) In the present invention, various silane-based surface active agents having different critical surface energies may be used. Examples for such surface active agents include surface active agents in which one end or a part of the carbon chains or the siloxane chains is substituted by one organic group selected from the group of a carbon trifluoride group (—CF$_3$), a methyl group (—CH$_3$), a vinyl group (—CH═CH$_2$), an allyl group (—CH═CH—), an acetylene group (—C≡C—), a phenyl group (—C$_6$H$_5$), an aryl group (—C$_6$H$_4$—), a halogen atom, an alkoxy group (—OR; R is an alkyl group with a carbon number of 1 to 3.), a cyano group (—CN), an amino group (—NH$_2$), a hydroxyl group (—OH), a carbonyl group (═CO), an carboxy group (—COO—) and a carboxyl group (—COOH). It was confirmed that by using such surface active agents, the critical surface energy of the chemisorption film is readily controlled in the range of 10 to 55 dyn/cm.

INDUSTRIAL APPLICABILITY

As has been described above, according to the present invention, it is made possible to produce monomolecular films usable for the coating films for reforming a surface of a base material and for alignment layers for controlling the alignment of liquid crystal molecules, with high production efficiency. In addition, according to the invention, it is made possible to produce multi-domain alignment type liquid crystal display devices with high production efficiency. Hence, the present invention is remarkably useful in the industry.

What is claimed is:

1. A method of forming a monomolecular chemisorption film comprising at least the steps of:

forming a solution layer on a surface of a base material by contacting a chemisorption solution with the surface of the base material, said chemisorption solution including a silane-based surface active agent and a nonaqueous organic solvent;

accelerating a chemisorption reaction by evaporating said organic solvent and concentrating the silane-based surface active agent contained in said solution layer in a dry atmosphere having a relative humidity of 30% or less to chemisorb the silane-based surface active agent onto the surface of the base material;

aging to complete the chemisorption reaction for a predetermined time after the evaporating said organic solvent in said solution layer; and washing the surface of the base material with a nonaqueous organic solvent to remove unreacted silane-based surface active agent remaining on the surface of the base material.

2. A method of forming a monomolecular chemisorption film according to claim 1, wherein said nonaqueous organic solvent in said chemisorption solution has a boiling point of 100 to 250° C.

3. A method of forming a monomolecular chemisorption film according to claim 1, wherein each of said nonaqueous organic solvent in said chemisorption solution and said nonaqueous organic solvent used in said step of washing has a functional group selected from the group consisting of an alkyl group, a fluorocarbon group, a chlorocarbon group and a siloxane group.

4. A method of forming a monomolecular chemisorption film according to claim 3, wherein said nonaqueous organic solvent having a siloxane group is a silicone-based solvent.

5. A method of forming a liquid crystal alignment layer according to claim 3, wherein said silane-based surface active agent is a mixture of a plurality of silane-based surface active agents having a different critical surface energy each other.

6. A method of forming a liquid crystal alignment layer according to claim 3, wherein said silane-based surface active agent is a silane-based surface active agent comprising one of a linear carbon chain and a linear siloxane chain; and at least one silyl group selected from the group consisting of a chlorosilyl group, an alkoxysilyl group and an isocyanatosilyl group.

7. A method of forming a liquid crystal alignment layer according to claim 6, wherein said one of said carbon chain and said siloxane chain is such that an end or a part thereof is substituted by at least one organic group selected from the group consisting of a carbon trifluoride group (—CF$_3$), a methyl group (—CH$_3$), a vinyl group (—CH═CH$_2$), an allyl group (—CH═CH—), an acetylene group (—C≡C—), a phenyl group (—C$_6$H$_5$), an aryl group (—C$_6$H$_4$—), a halogen atom, an alkoxy group (—OR, where R is an alkyl group), a cyano group (—CN), an amino group (—NH$_2$), a hydroxyl group (—OH), a carbonyl group (═CO), an carboxy group (—COO—) and a carboxyl group (—COOH).

8. A method of forming a liquid crystal alignment layer comprising a chemisorption film wherein molecules of a surface active agent are chemisorbed on a surface of a substrate on which an electrode is provided, comprising at least the steps of:

forming a solution layer on the surface of the substrate by contacting a chemisorption solution with the surface of the substrate, said chemisorption solution including a silane-based surface active agent and a nonaqueous organic solvent;

accelerating a chemisorption reaction by evaporating said organic solvent and concentrating the silane-based surface active agent contained in said solution layer in a dry atmosphere having a relative humidity of 30% or less to chemisorb the silane-based surface active agent onto the surface of the substrate;

aging to complete the chemisorption reaction for a predetermined time after the evaporating said organic solvent in said solution layer; and washing the surface of the substrate with a nonaqueous organic solvent to remove unreacted silane-based surface active agent remaining on the surface of the substrate.

9. A method of forming a liquid crystal alignment layer according to claim 8, wherein in said step of forming a solution layer, said chemisorption solution is applied onto the substrate surface by one of an offset printing, a screen printing, and a roll coating.

10. A method of forming a liquid crystal alignment layer according to claim 8, further comprising the step of forming an underlayer prior to said step of forming said solution layer, wherein:

another solution layer is formed on the substrate surface directly by contacting another solution to said substrate surface, said another solution wherein a chemical adsorbate having a plurality of chlorosilyl groups is dissolved in a solvent;

thereafter said solvent in said another solution layer is evaporated in a dry atmosphere to form siloxane-bonds from said chemical adsorbate in said another solution layer on the substrate surface;

thereafter the substrate surface is washed to remove unadsorbed molecules from the substrate surface; and the substrate surface is exposed to a moist air, so that OH groups are added to chlorosilyl groups in said molecules of said adsorbate.

11. A method of forming a liquid crystal alignment layer according to claim 8, further comprising the step of, after said step of washing, pre-aligning the adsorbed molecules chemisorbed on the substrate surface in a predetermined direction, by pulling the substrate out in a predetermined direction in a dry atmosphere to drain-dry the solvent on the substrate surface.

12. A method of forming a liquid crystal alignment layer according to claim 11, further comprising the step of, after said step of pre-aligning, realigning said adsorbed molecules pre-aligned in a predetermined direction by irradiating said substrate surface with a polarized light.

13. A method of forming a monomolecular chemisorption film according to claim 12, wherein said silane-based surface active agent is a mixture of a plurality of silane-based surface active agents having a different critical surface energy each other.

14. A method of forming a liquid crystal alignment layer according to claim 12, wherein said silane-based surface active agent is a silane-based surface active agent comprising one of a linear carbon chain and a linear siloxane chain; and at least one silyl group selected from the group consisting of a chlorosilyl group, an alkoxysilyl group and an isocyanatosilyl group.

15. A method of forming a liquid crystal alignment layer according to claim 14, wherein said carbon chain or siloxane chain is such that an end or a part thereof is substituted by at least one organic group selected from the group consisting of a carbon trifluoride group (—$CF_3$), a methyl group (—$CH_3$), a vinyl group (—CH=$CH_2$), an allyl group (—CH=CH—), an acetylene group (—C≡C—), a phenyl group (—$C_6H_5$), an aryl group (—$C_6H_4$—), a halogen atom, an alkoxy group (—OR, where R is an alkyl group), a cyano group (—CN), an amino group (—$NH_2$), a hydroxyl group (—OH), a carbonyl group (=CO), an carboxy group (—COO—) and a carboxyl group (—COOH).

16. A method of forming a liquid crystal alignment layer according to claim 14, wherein;
said dry atmosphere has a relative humidity of 30% or less; and
said step of pre-aligning is performed in an atmosphere having a relative humidity of 30% or less.

17. A method of forming a monomolecular chemisorption film according to claim 16, wherein said nonaqueous organic solvent in said chemisorption solution has a boiling point of 100 to 250° C.

18. A method of forming a monomolecular chemisorption film according to claim 14, wherein each of said nonaqueous organic solvent in said chemisorption solution and said nonaqueous organic solvent used in said step of washing has a functional group selected from the group consisting of an alkyl group, a fluorocarbon group, a chlorocarbon group and a siloxane group.

19. A method of forming a monomolecular chemisorption film according to claim 18, wherein said solvent having a siloxane group is a silicone-based solvent.

20. A method of forming a liquid crystal alignment layer according to claim 9, wherein said chemisorption solution has a solution viscosity of 1 to 50000 cSt.

21. A method of forming a liquid crystal alignment layer according to claim 20, wherein a silicone is used as a solvent for adjusting said solution viscosity of said chemisorption solution.

22. A method of manufacturing a liquid crystal display device comprising at least the steps of:

forming a solution layer on a surface of a first substrate having a plurality of electrodes formed in a matrix by contacting a chemisorption solution with the surface of the substrate in a dry atmosphere, said chemisorption solution containing a silane-based surface active agent and a nonaqueous organic solvent;

evaporating said organic solvent in the solution layer in a dry atmosphere to chemisorb molecules of the silane-based surface active agent onto the surface of the substrate;

washing the substrate surface having chemisorbed molecules of the silane-based surface active agent with a washing solution comprising a nonaqueous organic solvent to remove unadsorbed molecules of the silane-based surface active agent off from the substrate surface;

after said step of washing, pre-aligning chemisorbed molecules on the substrate surface in a predetermined direction, by pulling the substrate out in a predetermined direction in a dry atmosphere to drain-dry the solvent on the substrate surface and to pre-align the molecules chemisorbed on the substrate;

realigning said chemisorbed molecules in a predetermined direction by irradiating said pre-aligned chemisorbed molecules with a polarized light; and assembling a liquid crystal cell by opposing said first substrate having an alignment layer formed by said step of realigning and a second substrate having a counter electrode with a predetermined gap so that each of the substrate surfaces provided with said electrode faces inwardly.

23. A method of manufacturing a liquid crystal display device according to claim 22, wherein said step of realigning is such that using a polarizer and a patterned mask overlaid on the polarizer, said polarized light is irradiated a plurality of times onto each pixel having a plurality of micro-sections, in such a manner that in each time said polarized lights portioned in different directions are correspondingly applied to one of said plurality of micro-sections to form an alignment layer in which each of said plurality of micro-sections has a different realigning direction.

24. A method of manufacturing a liquid crystal display device according to claim 23, wherein said step of chemisorbing comprises the steps of:

accelerating a chemisorption reaction by evaporating said organic solvent in said solution layer; and aging to complete the chemisorption reaction for a predetermined time after the evaporating said organic solvent in said solution layer.

25. A method of manufacturing a liquid crystal display device according to claim 24, wherein said silane-based surface active agent is a silane-based surface active agent comprising one of a linear carbon chain and a linear siloxane chain; and at least one silyl group selected from the group consisting of a chlorosilyl group, an alkoxysilyl group and an isocyanatosilyl group.

26. A method of manufacturing a liquid crystal display device according to claim 25, wherein said one of said carbon chain and siloxane chain is such that an end or a part thereof is substituted by at least one organic group selected from the group consisting of a carbon trifluoride group ($-CF_3$), a methyl group ($-CH_3$), a vinyl group ($-CH=CH_2$), an allyl group ($-CH=CH-$), an acetylene group ($-C\equiv C-$), a phenyl group ($-C_6H_5$), an aryl group ($-C_6H_4-$), a halogen atom, an alkoxy group ($-OR$, where R is an alkyl group), a cyano group ($-CN$), an amino group ($-NH_2$), a hydroxyl group ($-OH$), a carbonyl group ($=CO$), an carboxy group ($-COO-$) and a carboxyl group ($-COOH$).

27. A method of manufacturing a liquid crystal display device according to claim 26, wherein:

said dry atmosphere has a relative humidity of 30% or less; and said step of pre-aligning is performed in an atmosphere having a relative humidity of 30% or less.

28. A method of manufacturing a liquid crystal display device according to claim 27, wherein said nonaqueous organic solvent in said chemisorption solution has a boiling point of 100 to 250° C.

29. A method of manufacturing a liquid crystal display device according to claim 27, wherein each of said nonaqueous organic solvent in said chemisorption solution and said nonaqueous organic solvent used in said step of washing has a functional group selected from the group consisting of an alkyl group, a fluorocarbon group, a chlorocarbon group and a siloxane group.

30. A method of manufacturing a liquid crystal display device according to claim 29, wherein said nonaqueous organic solvent having a siloxane group is a silicone-based solvent.

31. A method of manufacturing a liquid crystal display device according to claim 28, wherein in said step of forming a solution layer, said chemisorption solution is applied onto the substrate surface by one of an offset printing, a screen printing, and a roll coating.

32. A method of manufacturing a liquid crystal display device according to claim 31, wherein said chemisorption solution has a solution viscosity of 1 to 50000 cSt.

33. A method of manufacturing a liquid crystal display device according to claim 32, wherein said solution viscosity is adjusted to be 1 to 50000 cSt by adding silicone to said chemisorption solution.

34. A method of forming a liquid crystal alignment layer according to claim 22, further comprising the step of forming an underlayer prior to said step of forming said solution layer, wherein:

another solution layer is formed on the substrate surface directly by contacting another solution to said substrate surface, said another solution wherein a chemical adsorbate having a plurality of chlorosilyl groups is dissolved in a solvent;

thereafter said solvent in said another solution layer is evaporated in a dry atmosphere to form siloxane-bonds from said chemical adsorbate in said another solution layer on the substrate surface;

thereafter the substrate surface is washed to remove unadsorbed molecules from the substrate surface; and the substrate surface is exposed to a moist air, so that OH groups are added to chlorosilyl groups in said molecules of said adsorbate.

\* \* \* \* \*

UNITED STATES PATENT AND TRADEMARK OFFICE
CERTIFICATE OF CORRECTION

PATENT NO. : 6,517,401 B1
DATED : February 11, 2003
INVENTOR(S) : Kazufumi Ogawa, Tadashi Ohtake and Takaiki Nomura It is certified that error appears in the above-identified patent and that said Letters Patent is hereby corrected as shown below:

Title page,
Item [54], change "PROCESS FOR THE PRODUCTION OF MONOMOLECULAR CHEMISORPTION FILM, AND PROCESSES FOR THE PRODUCTION OF LIQUID CRYSTAL ALIGNMENT FILMS AND LIQUID CRYSTAL DISPLAYS BY USING THE CHEMISORPTION FILM" to
-- METHODS OF FORMING MONOMOLECULAR CHEMISORPTION FILMS AND LIQUID CRYSTAL ALIGNMENT LAYERS UTILIZING THE FILMS, AND METHODS OF MANUFACTURING LIQUID CRYSTAL DISPLAY DEVICES UTILIZING THE FILMS --;

Item [30], Foreign Application Priority Data, change
"Nov. 18, 1997    (JP)    .......9-317299" to
-- Nov. 18, 1997    (JP)    .......9-317229 --.

Column 5,
Line 49, change "an" to -- a --.

Column 7,
Line 46, change "an" to -- a --.

Column 21,
Line 20, change "an" to -- a --.

Column 22,
Line 29, change "an" to -- a --.

Column 23,
Line 43, change "an" to -- a --.

UNITED STATES PATENT AND TRADEMARK OFFICE
CERTIFICATE OF CORRECTION

PATENT NO. : 6,517,401 B1
DATED : February 11, 2003
INVENTOR(S) : Kazufumi Ogawa, Tadashi Ohtake and Takaiki Nomura It is certified that error appears in the above-identified patent and that said Letters Patent is hereby corrected as shown below:

Column 25,
Line 8, change "an" to -- a --.

Signed and Sealed this

Seventeenth Day of June, 2003

JAMES E. ROGAN
*Director of the United States Patent and Trademark Office*